(12) United States Patent
Vempati et al.

(10) Patent No.: US 11,193,334 B2
(45) Date of Patent: Dec. 7, 2021

(54) ADDITIVE MANUFACTURING CONTROLLED FAILURE STRUCTURE AND METHOD OF MAKING SAME

(71) Applicants: Chaitanya Vempati, Conroe, TX (US); Christoph Wangenheim, Hemmingen (DE)

(72) Inventors: Chaitanya Vempati, Conroe, TX (US); Christoph Wangenheim, Hemmingen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/421,085

(22) Filed: May 23, 2019

(65) Prior Publication Data

US 2019/0309577 A1    Oct. 10, 2019

Related U.S. Application Data

(62) Division of application No. 15/002,542, filed on Jan. 21, 2016, now Pat. No. 10,392,864.

(51) Int. Cl.
*E21B 10/00* (2006.01)
*B22F 7/06* (2006.01)
(Continued)

(52) U.S. Cl.
CPC .............. *E21B 10/00* (2013.01); *B22F 7/06* (2013.01); *B22F 10/20* (2021.01);
(Continued)

(58) Field of Classification Search
CPC .......... E21B 17/02; E21B 31/00; E21B 29/02; E21B 10/00; B29C 64/386; B22F 2005/001; B22F 2999/00; B22F 7/06; B22F 3/1055; B33Y 30/00; B33Y 50/02; B33Y 10/00; B33Y 80/00; B23K 2101/002; B23K 26/342; B23K 26/70; B23K 15/0086; B23P 6/04; G05B 19/4099; G05B 2219/35134; G05B 2219/49007; Y02P 10/295
(Continued)

(56) References Cited

U.S. PATENT DOCUMENTS 3,145,790 A * 8/1964 Bridwell ................. E21B 10/54
                                                              175/425
6,214,250 B1   4/2001  Moh et al.
(Continued)

FOREIGN PATENT DOCUMENTS

DE    19758083 A1   7/1999
EP     2596201 A2   5/2013
(Continued)

OTHER PUBLICATIONS

Oxford Dictionary definition of Geometry, https://www.lexico.com/en/definition/geometry. (Year: 2021).*
(Continued)

*Primary Examiner* — Rebecca Janssen
(74) *Attorney, Agent, or Firm* — Cantor Colburn LLP

(57) ABSTRACT

A downhole component including a first portion; a second portion; a controlled failure structure between the first portion and second portion. A method for improving efficiency in downhole components.

4 Claims, 10 Drawing Sheets

(51) Int. Cl.
| | |
|---|---|
| *B22F 10/20* | (2021.01) |
| *B33Y 10/00* | (2015.01) |
| *B22F 5/00* | (2006.01) |
| *E21B 17/02* | (2006.01) |
| *B29C 64/386* | (2017.01) |
| *B33Y 80/00* | (2015.01) |
| *B23K 26/342* | (2014.01) |
| *B23K 26/70* | (2014.01) |
| *B23K 15/00* | (2006.01) |
| *B23P 6/04* | (2006.01) |
| *E21B 31/00* | (2006.01) |
| *G05B 19/4099* | (2006.01) |
| *B23K 101/00* | (2006.01) |
| *B33Y 30/00* | (2015.01) |
| *B33Y 50/02* | (2015.01) |

(52) U.S. Cl.
CPC ........ *B23K 15/0086* (2013.01); *B23K 26/342* (2015.10); *B23K 26/70* (2015.10); *B23P 6/04* (2013.01); *B29C 64/386* (2017.08); *B33Y 10/00* (2014.12); *B33Y 80/00* (2014.12); *E21B 17/02* (2013.01); *E21B 31/00* (2013.01); *G05B 19/4099* (2013.01); *B22F 2005/001* (2013.01); *B22F 2999/00* (2013.01); *B23K 2101/002* (2018.08); *B33Y 30/00* (2014.12); *B33Y 50/02* (2014.12); *G05B 2219/35134* (2013.01); *G05B 2219/49007* (2013.01); *Y02P 10/25* (2015.11)

(58) Field of Classification Search
USPC ........................................................ 166/376
See application file for complete search history.

(56) References Cited

U.S. PATENT DOCUMENTS

| | | | |
|---|---|---|---|
| 6,439,305 B1 | 8/2002 | Bakke | |
| 6,651,756 B1 | 11/2003 | Costo, Jr. et al. | |
| 6,884,486 B2 | 4/2005 | Estrin et al. | |
| 7,131,505 B2 | 11/2006 | Galloway et al. | |
| 7,243,728 B2 | 7/2007 | Stoesz et al. | |
| 7,726,415 B1 | 6/2010 | Tipton et al. | |
| 8,168,917 B2 | 5/2012 | Blakeley | |
| 8,320,648 B2 | 11/2012 | Mailling et al. | |
| 8,323,122 B2 | 12/2012 | Soracco et al. | |
| 8,616,126 B2 | 12/2013 | Byrne et al. | |
| 8,829,390 B2 | 9/2014 | Van De Sanden et al. | |
| 2003/0178079 A1 | 9/2003 | Friedrich | |
| 2004/0045941 A1 | 3/2004 | Herzog et al. | |
| 2011/0308813 A1 | 12/2011 | Barron et al. | |
| 2012/0160516 A1 | 6/2012 | Ravensbergen et al. | |
| 2012/0247840 A1 | 10/2012 | Vempati et al. | |
| 2012/0298366 A1 | 11/2012 | Davis et al. | |
| 2013/0310961 A1 | 11/2013 | Velez | |
| 2014/0135850 A1 | 5/2014 | Parent et al. | |
| 2014/0196900 A1 | 7/2014 | Twardowski et al. | |
| 2014/0223833 A1* | 8/2014 | Welch | E21B 10/43 51/297 |
| 2014/0301179 A1 | 10/2014 | Rich et al. | |
| 2015/0001093 A1 | 1/2015 | Carter et al. | |
| 2016/0138362 A1* | 5/2016 | Dockweiler | E21B 33/1216 166/138 |
| 2017/0211331 A1 | 7/2017 | Vempati et al. | |
| 2017/0306699 A1 | 10/2017 | Tulloch | |

FOREIGN PATENT DOCUMENTS

| | | |
|---|---|---|
| WO | 0065194 A1 | 11/2000 |
| WO | 2012012774 A2 | 1/2012 |

OTHER PUBLICATIONS

Notification of Transmittal of the International Search Report and the Written Opinion of the International Searching Authority, or the Declaration; PCT/US2017/14310; dated Apr. 27, 2017; 13 pages.
Schlumberger, "Advanced Fracturing Fluids Improve Well Economics"; Autumn 1995; 18 pages.

* cited by examiner

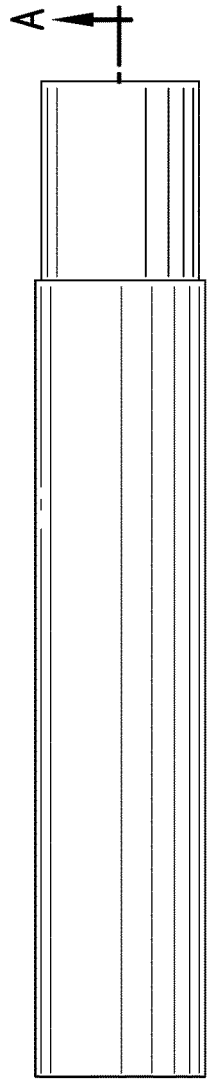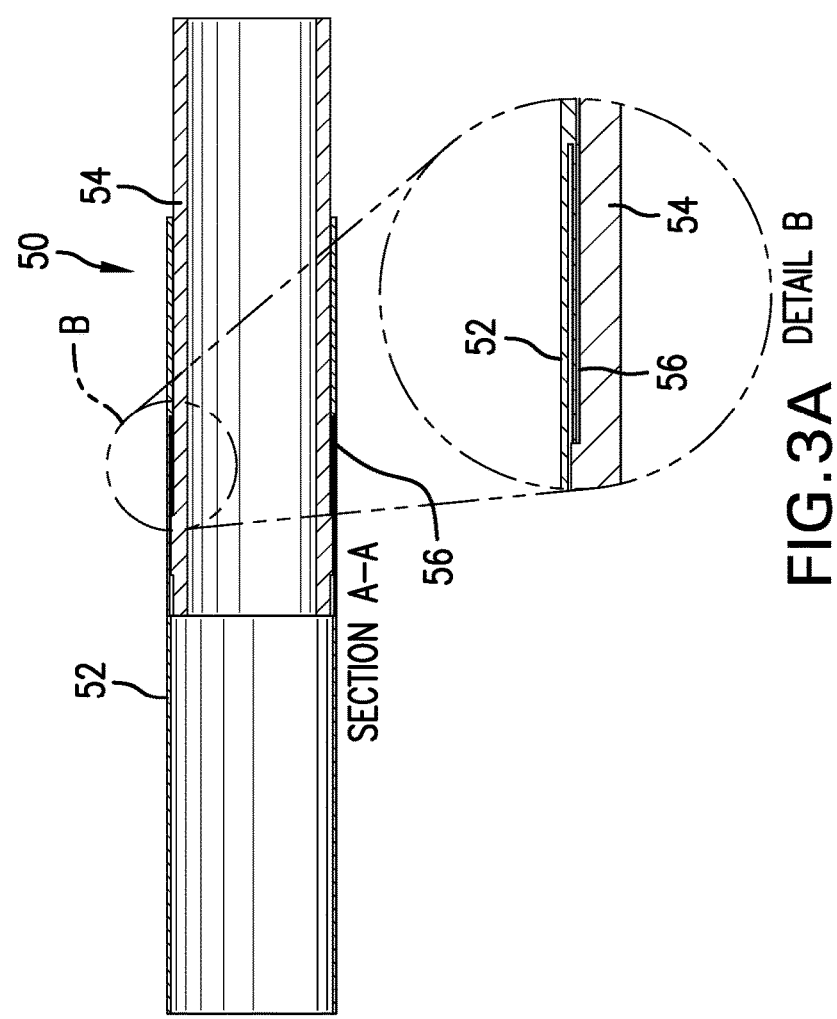

ADDITIVE MANUFACTURING CONTROLLED FAILURE STRUCTURE AND METHOD OF MAKING SAME

CROSS REFERENCE TO RELATED APPLICATIONS

This application is a divisional of U.S. application Ser. No. 15/002,542 filed Jan. 21, 2016, the disclosure of which is incorporated by reference herein in its entirety.

BACKGROUND

In many industries tool and part breakage is unfortunately a part of norm. Tools break and need to be replaced. Adding to the frustration of breakage though is when this happens in operations where replacement is difficult or excessively expensive or time consuming. Such is the case with downhole tools, for example. Breakage of tools run into the downhole environment presents not only the obvious initial problem of "the tool broke" but the ancillary problems caused by the location of the broken tool thousands of feet down the hole and that it can be exceptionally difficult to remove from the hole.

Operations on a rig used for running tools in and out of the downhole environment are very costly to undertake and while those operations are not producing a target fluid to put the operation "in the black", they are huge financial drains for the organization running the operation.

In view of the foregoing, operators would well receive technologies that improve any of the drawbacks noted above.

BRIEF DESCRIPTION

A downhole component including a first portion; a second portion; a controlled failure structure between the first portion and second portion.

A method for improving efficiency in downhole components including forming a component having a controlled failure structure therein, the structure comprising a selected three dimensional geometry, the geometry exhibiting a material property distinct from surrounding material property.

A method for improving efficiency in downhole components including forming a component having a controlled failure structure therein, the structure comprising a selected three dimensional geometry, the geometry exhibiting one or more areas having a material property distinct from surrounding material property.

A computer-readable storage medium having data thereon representing a three-dimensional model suitable for use in manufacturing a downhole component including a first portion; a second portion; a controlled failure structure between the first portion and second portion.

A method for making a downhole tool having a controlled failure structure that provides upon tool failure another useful profile including directing a head of an additive manufacturing device to produce a first portion of the tool; directing the head of the additive manufacturing device to produce a second portion of the tool; and directing the head of the additive manufacturing device to produce a controlled failure structure between the first portion and the second portion of the tool.

BRIEF DESCRIPTION OF THE DRAWINGS

The following descriptions should not be considered limiting in any way. With reference to the accompanying drawings, like elements are numbered alike:

FIG. 3 is a cross section view of a tubular configured in accordance with another embodiment hereof;

FIG. 3A is an enlarged view of a portion of FIG. 3 circumscribed as A-A;

DETAILED DESCRIPTION

A detailed description of one or more embodiments of the disclosed apparatus and method are presented herein by way of exemplification and not limitation with reference to the Figures.

Figure 1:
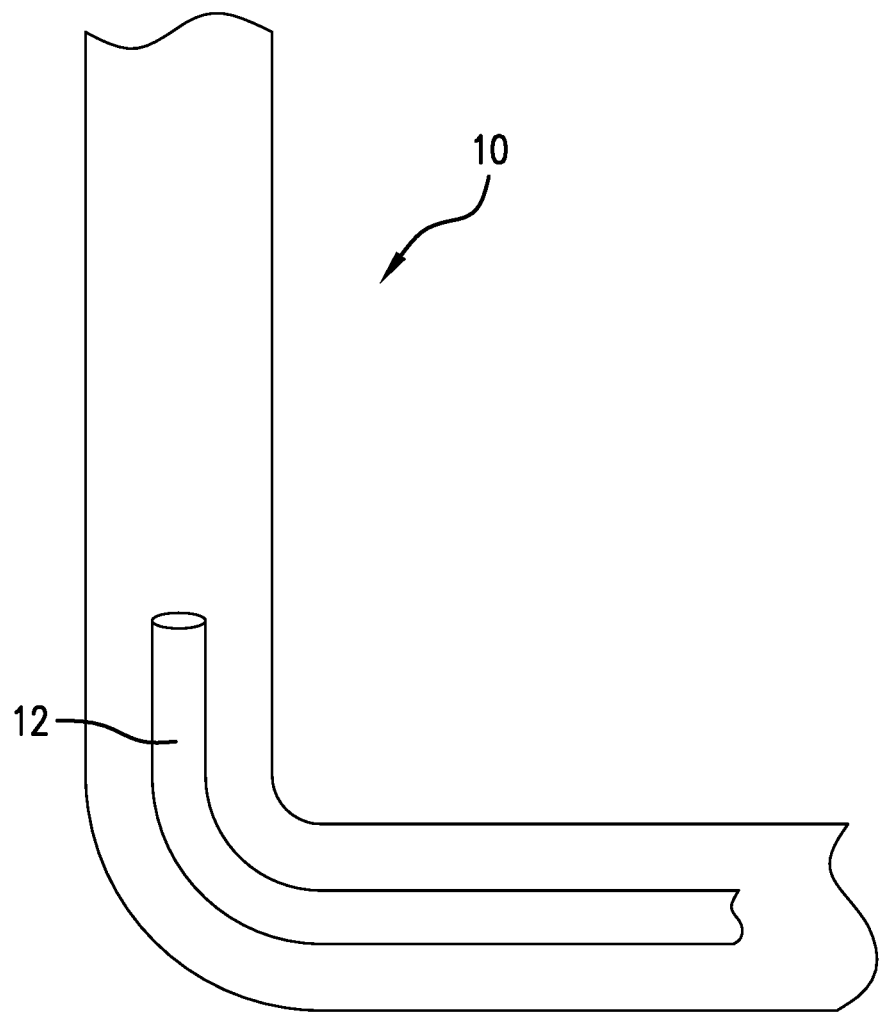
FIG. 1 is a view of a borehole system in which one embodiment of the disclosure hereof is a part.
Figure 2:
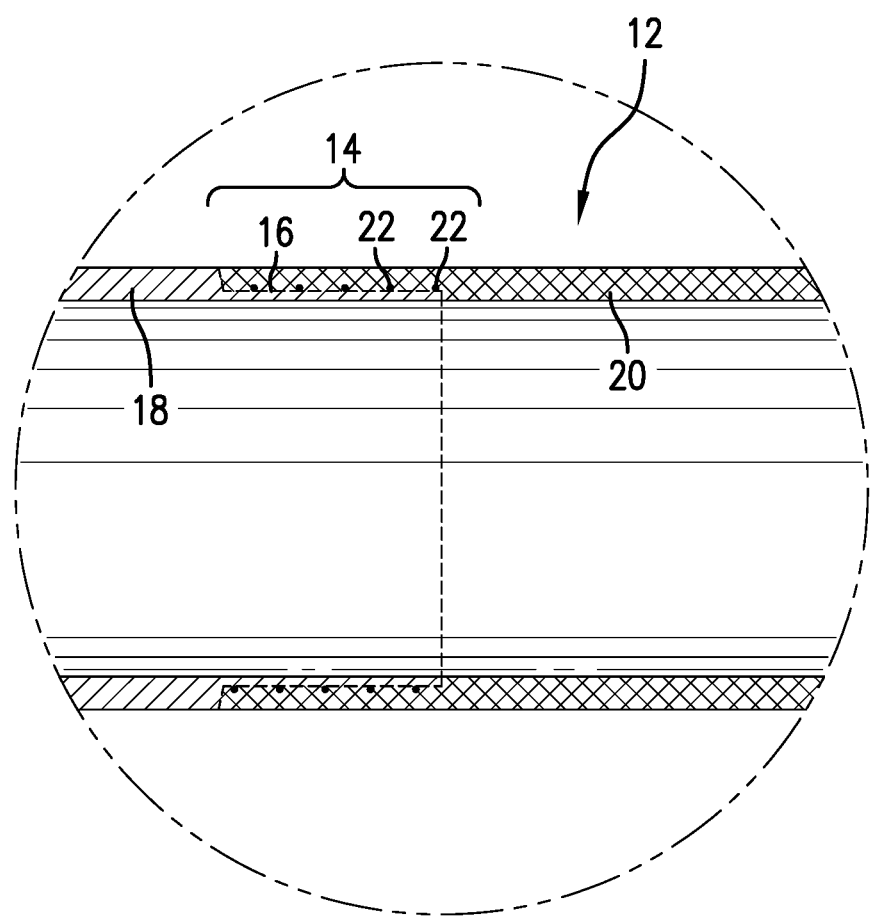
FIG. 2 is a cross section view of a tubular configured in accordance with an embodiment hereof.
Figure 4:
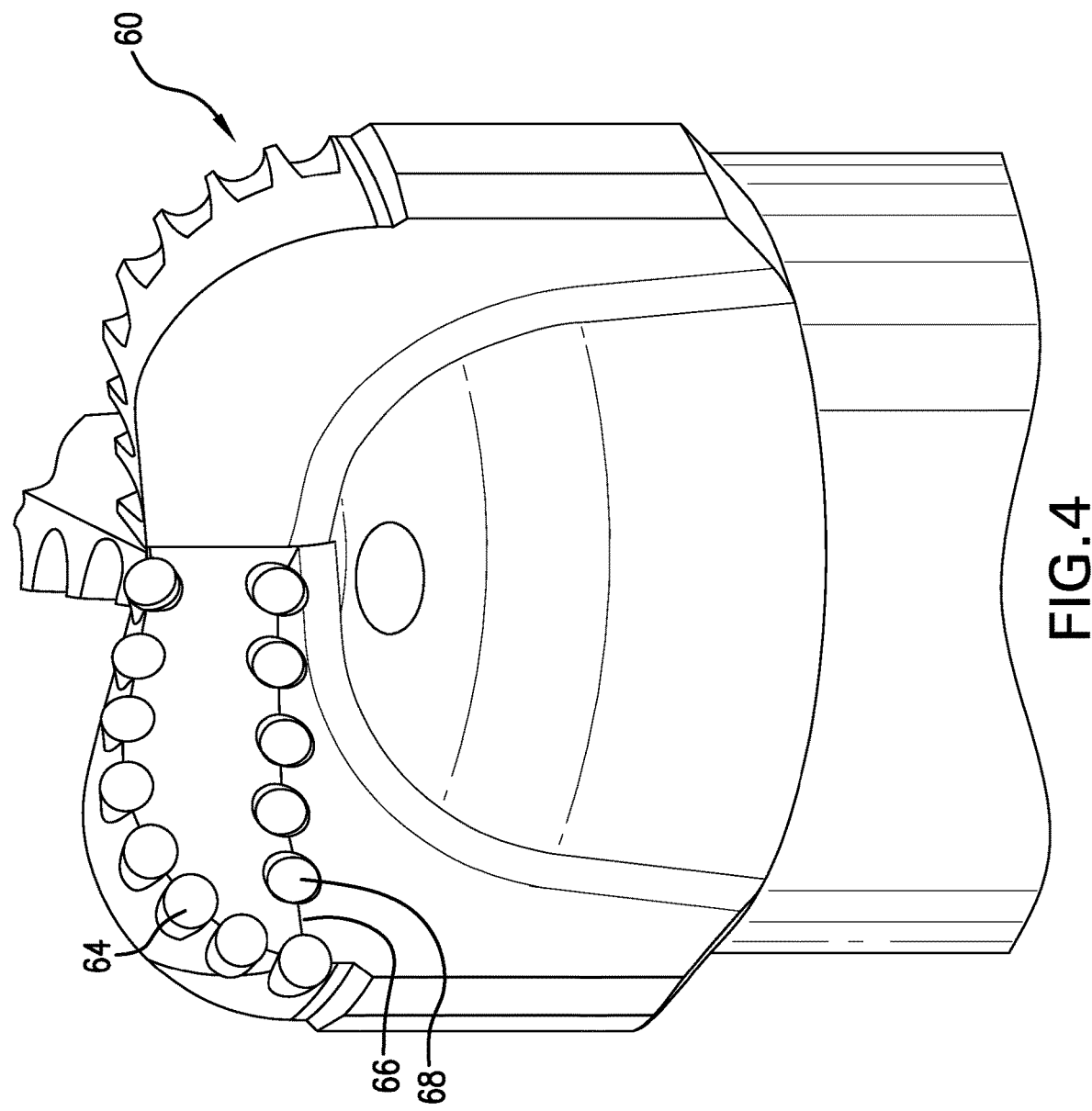
FIG. 4 is a perspective schematic view of a drilling or milling bit embodiment hereof.
Figure 7:
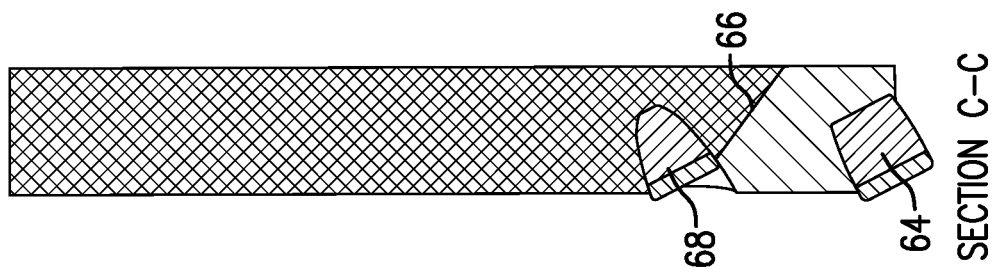
FIG. 7 is another section view of FIG. 5 looking in the opposite direction.
Figure 6:
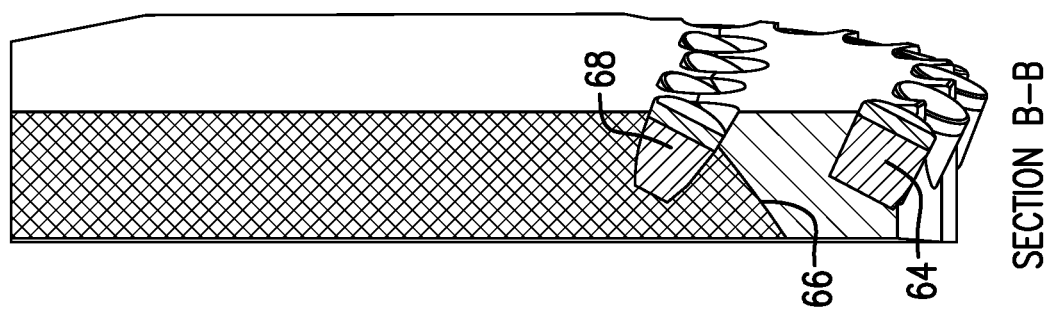
FIG. 6 is a section view of FIG. 5.
Figure 5:
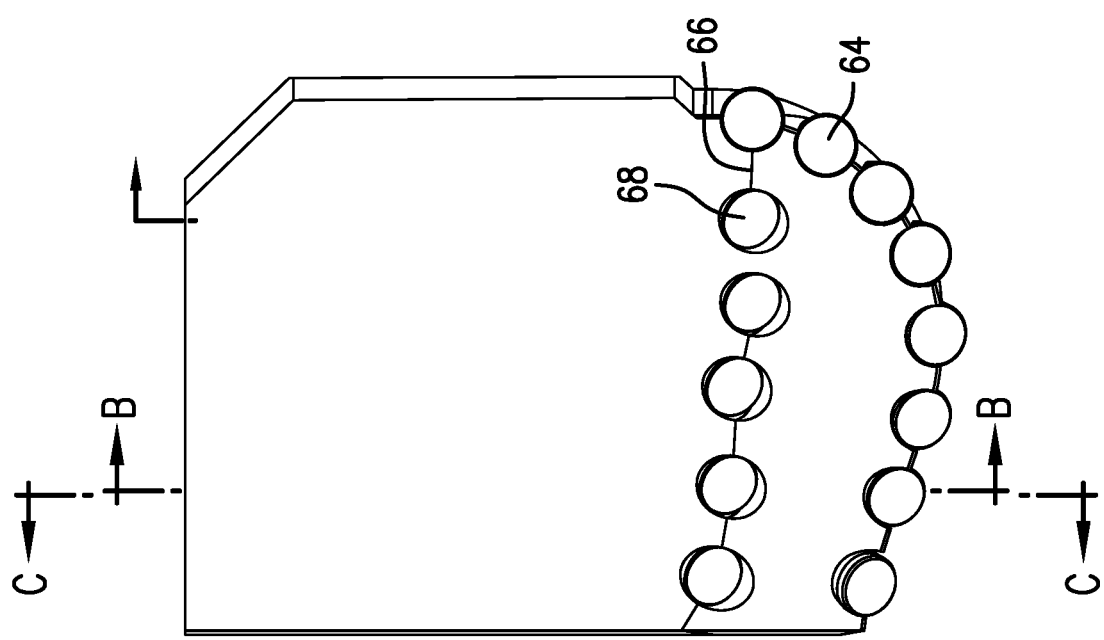
FIG. 5 is a view of a portion of FIG. 4.

Referring to FIG. 1, a generic looking view of a borehole system 10 is presented illustrating one embodiment of a component 12 having a controlled failure structure. More specifically, and referring additionally to FIG. 2, the component 12 is a joint that is additively manufactured to have a controlled failure structure 14 that is in a selected three dimensional geometry such that if the component 12 is subjected to a force having a magnitude greater than its design point for failure of the structure 14, the actual failure that will occur is controlled to produce a particular profile. In this embodiment, the profile created is a fishing neck. In FIG. 2, three similar embodiments are considered. The first is a change in material property that exists at an interface 16 between component first portion 18 and component second portion 20. The second embodiment considered in FIG. 2 adds discontinuities 22 to the interface 16, the discontinuities also having a material property selected to cause a desired failure effect and finally, a third embodiment is considered that utilizes just the discontinuities 22 such that the interface 16 has no material property change. In each case, the interface and/or discontinuities will cause a controlled failure leaving a profile that is desirable to the intended follow up operation. In connection with FIGS. 1 and 2, that operation will be a fishing operation and accordingly each of the preplanned failures controlled by the interface and or discontinuities will result in a fishing neck being created. Fishing necks may be OD or ID as those of skill in the art will understand. Both are here illustrated depending upon which end of FIG. 2 one posits is uphole. If the left side of the FIG. 2 uphole then the remaining fishing neck after controlled failure will be an ID fishing neck. If on the other hand, uphole is to the right side of the Figure, then the fishing neck is an OD variety. This is because the component 12 when subjected to a selected magnitude of Torque, will fail along the interface 16 and/or discontinuities 22. It is to be understood that the interface and discontinuities are examples only rather than an exhaustive list of feature creation that can cause a desired failure pattern.

It will be appreciated that the discontinuities are toroidally shaped discontinuities 22 as illustrated and number five in the Figure. More or fewer are contemplated. The discontinuities 22 may be of any cross sectional geometry, circular, as shown, being only one option. The discontinuities represent a change in material property that is directed at the manufacturing stage.

The discontinuities 22 have two functions that may both be used or may individually be used. These are 1) as perforations to direct a failure line, similar to a sheet of perforated notebook paper and 2) to create features in the fishing neck profile that aid in gripping of the neck by a fishing tool. One will easily appreciate the first function from the analogy. Creating perforations in a row in a material will tend to cause tearing of material in that vicinity to follow the discontinuities as they represent stress risers in the material. The second function takes advantage of the three dimensional nature of the discontinuities in that at the failure profile, the surface created will have indentations or protuberances that circle around the component similar to threads or wickers. These features give the fishing tool something to grab on to and improve retention of the fish on the fishing tool.

The material property change in a same material may be tensile strength, density, porosity, etc. or the change in property may be contingent upon an actual change in material itself. The component 12 is created in one embodiment using an additive manufacturing process such as Direct Metal Laser Melting or Direct Metal Laser Sintering, or electron beam melting, for example. DMLM is a powder bed additive manufacturing process that builds solid parts from three dimensional CAD (Computer Aided Design) models. The process enables layer upon layer deposition at selected tensile strength (for example) for each layer or each portion of a layer. By directing the location of material having selected properties, a pattern can be created in the component 12 where strength, for example, is reduced such that a failure will occur not randomly as is the case in the prior art but rather along a preplanned profile, explained above as the interface 16 and/or the discontinuities 22. Other additive manufacturing processes capable of producing parts contemplated herein include powder feed and wire feed processes. Additive manufacturing processes are known to the art and require no specific discussion in connection with this disclosure.

In each of the additive manufacturing processes noted above (or others functioning similarly) one of the operating parameters of the process will be modified to produce a material property in a location within the manufactured component that is different than that material property elsewhere in the manufactured component.

In order to change properties of the material in the discrete selected areas such as the interface 16 and/or the discontinuities 22, changes in one or more parameters of the additive manufacturing processes used to create the component 12 may be made. These changes include but are not limited to: varying the energy applied to the feed material by the energy source e.g. laser or electron beam (varying the energy source power including zero power, varying the energy source focus, varying the energy source scanning speed, varying the energy source line spacing) or varying the feed material itself may be employed. More specifically, with respect to energy applied, the energy source being employed, whether e.g. 200, 400, 1000 W or any other energy source power, may be reduced in power at the selected location to reduce the melting of the powdered (or other type) feed material. Reduction in the amount of melt will change the density, or other material property targeted, of the manufactured component in locations where melting was reduced or eliminated in the case of zero power (which will simply leave feed material unaltered, e.g. still powdered). Alternatively, one may change the energy source focus, which also changes the energy applied to the feed material. Further, another alternative is to change the laser energy source scanning speed to alter the energy imparted to the feed material in certain locations. Varying the line spacing of the scanning energy source results in altered porosity or density of the manufactured component in locations where line spacing diverges from otherwise normal line spacing for the part. Causing line spacing to become larger will result in reduced strength in those areas in which line spacing is increased. Each of these will change the degree of fusing of the feed material at that location with the surrounding particles of feed material and hence change the density or porosity of the final manufactured product at that location. Embodiments can also be achieved using a honeycombs at an interface or honey comb cell size variation such that the interface has a honeycomb cell size that results in a lower yield strength. Embodiments may also be constructed with voids therein in configurations that will cause the controlled failure.

While reducing energy applied is discussed above it is also important to note that energy increase can also be useful in achieving the controlled failure structure disclosed herein. Increasing energy source power will tend to vaporize the powdered metal thereby leaving porosity.

Referring back to the other identified method for altering the material properties in a component that does not rely upon energy supplied, the feed material itself may be altered. This may be accomplished by changing the material supplied at a feed head for powdered feed material or by changing the wire composition in a wire feed process. Processes capable of additive manufacturing with different materials include cold gas processes, energy source cladding or direct laser deposition, for example.

Differing feed materials may include all metals; plastics such as PEEK (polyetheretherketone); and/or ceramics that are applicable to additive manufacturing processes. Potential additional materials include but are not limited to PA12-MD (Al), PA12-CF, PA11, 18 Mar 300/1.2709, 15-5/1.4540, 1.4404 (316L), Alloy 718, Alloy 625, CoCrMo, UNS R31538, Ti6AI4V and AlSi10Mg, Alloy 945x, 17-4/1.4542, Ni Alloys, Alloy 925, CrMnMoN-steel, CoCr Alloys (Stellite), CoNi Alloy, MP35 or equivalent, 4140, 4145 and WC-Ni or WC-Co all of which are commercially available in the industry. Processes capable of additive manufacturing with different materials include cold gas processes, laser cladding or direct laser deposition, for example.

Referring now to FIGS. 3 and 3A, another embodiment of a component is illustrated with numeral 50 to distinguish the embodiment. In this embodiment, an overload protection arrangement is created using the same techniques discussed above. The component 50 comprises a housing 52 and a sleeve 54 moveable within the housing 52. At an end of the sleeve (with embodiments defined as part of the sleeve or axially adjacent the sleeve) is a crush ring 56. The crush ring is designed to fail at a selected load that is less than a failure load of some other component connected to the sleeve 54. The ring 56 has a structure that includes openness such that upon overloading the load carrying capacity of the ring 56, the actual material the ring 56 will be comminuted and will occupy less volume than it does when in the form of the crush ring 56. Resultantly, if a tool is being overloaded and the threshold for comminution of the crush ring is reached, the crush ring will be structurally fail and resulting in the smaller occupied volume. The change in volume of the crush ring 56 will be sudden and will be noticeable by an operator or control system through such telltale signs as a momentary change in weight on the string, a change in a position sensor, etc. The embodiment then provides both a structural impediment to an overload induced failure of a string and simultaneously a "signal" to an operator that an overload situation occurred. The crush ring is created using the processes hereinabove discussed.

Figure 8:
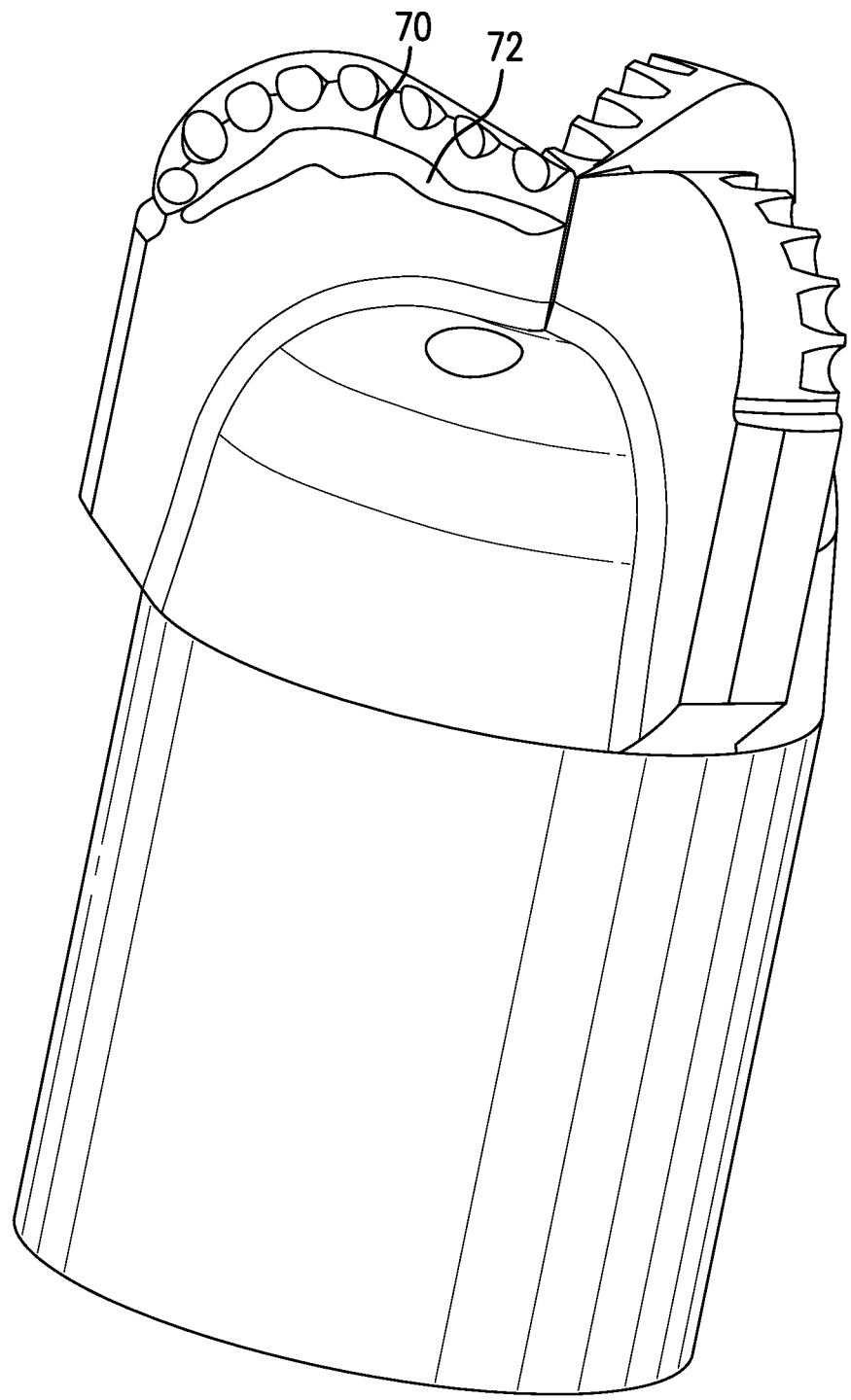
FIG. 8 is a perspective schematic view of a drilling or milling bit embodiment hereof.

In another embodiment, referring to FIG. 4-8, a drilling or milling bit 60 is constructed using the processes noted above to form a controlled failure that will produce another working drilling or milling bit. More particularly, the bit is configured with an internal profile 62 that resembles the original outer profile of the bit or a distinct outer profile that is another bit profile. This internal profile is defined by a change in material property as discussed above such that a condition that would ordinarily cause a bit failure will be preempted by this profile failing predictably instead yielding a new bit face for further operations without retrieving the bit to surface for repair or replacement. In the figure, the original profile includes cutters 64 at a leading end of the bit. As illustrated, the internal profile 66 may include cutters 68 embedded in the body of the bit that are exposed upon the controlled failure. Referring to FIG. 8, it is also contemplated to have multiple failure profiles identified at 70 and 72 such that wear or breakage will produce a preselected profile for further utility whether or not cutters are included and in fact whether or not the secondary or tertiary use is even as a bit. Other utility for the secondary or tertiary profiles is also contemplated.

In connection with the manufacture of the structures disclosed herein a computer-readable storage medium having data thereon representing a three-dimensional model suitable for use in manufacturing a downhole component comprising a first portion; a second portion; a controlled failure structure between the first portion and second portion is also contemplated. The controlled failure structure may be a selected three dimensional geometry having a specific utility post failure, in one embodiment. The computer readable storage medium may be configured to be read by an additive manufacturing device such as a three dimensional printer utilizing, for example, any of the methods disclosed above.

In addition to the foregoing, constructing bits with an internal structure that facilitates drilling through the bit after the bit has achieved its purpose or after the bit has become stuck or otherwise compromised are contemplated. These include hollow structure, a structure of limited material, a structure having a different strength characteristic whether it is the same base material or a different base material, etc. Yet further, it is contemplated to create by design stress risers in certain places to cause a controlled failure of the bit while that bit is being drilled out from behind. Particularly, certain shapes of bit fragments may be better suited to being circulated out of the hole and the construction of the bit can be controlled to create that shape fragment as opposed to a random shaped fragment when drilling out the bit from behind.

Figure 9:
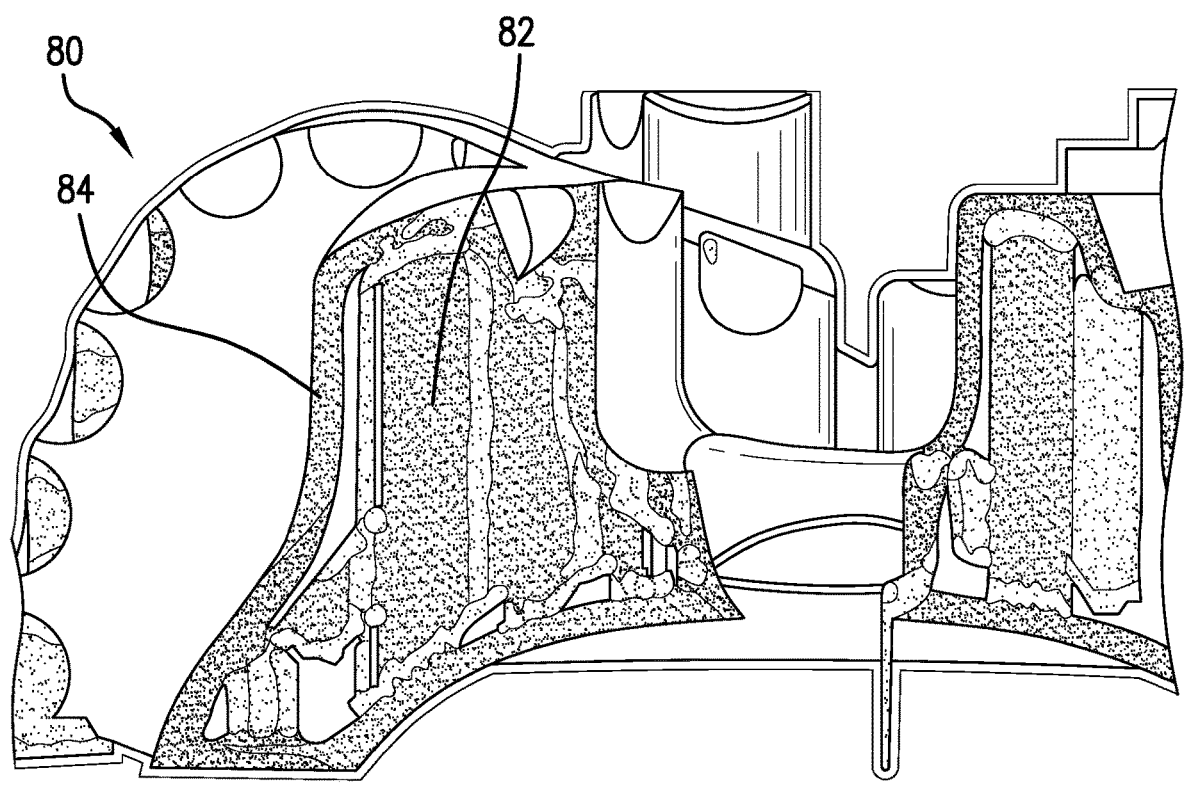
FIG. 9 is a schematic view of an easily drillable bit in accordance with the teachings hereof.
Figure 10:
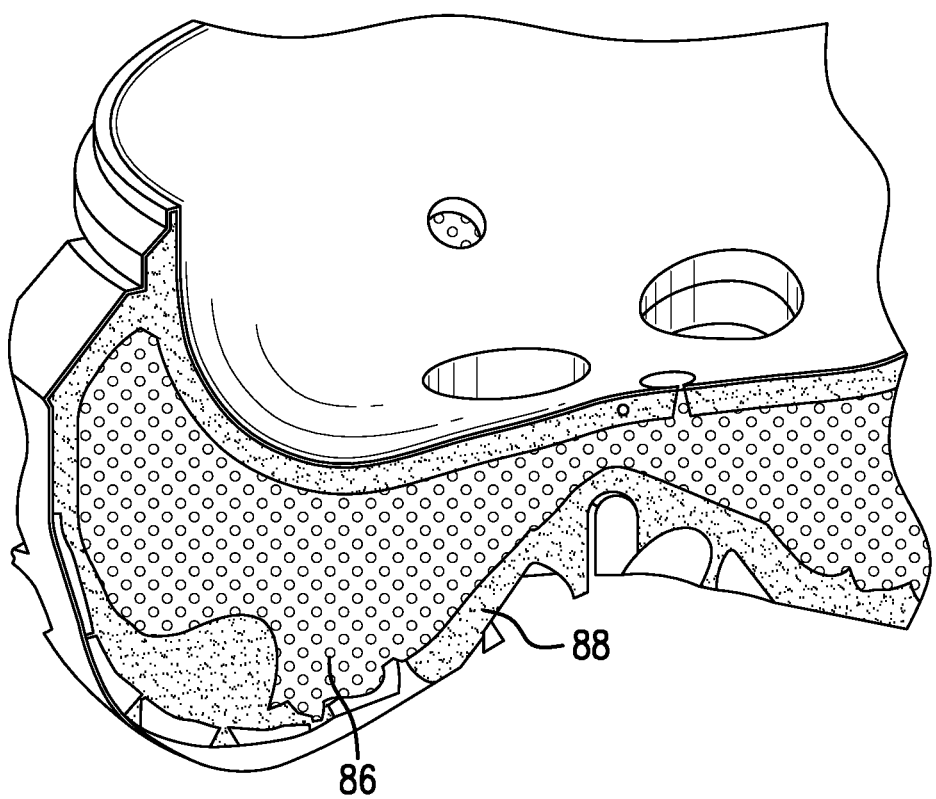
FIG. 10 is another embodiment of a bit in accordance with the teaching hereof.
Figure 11:
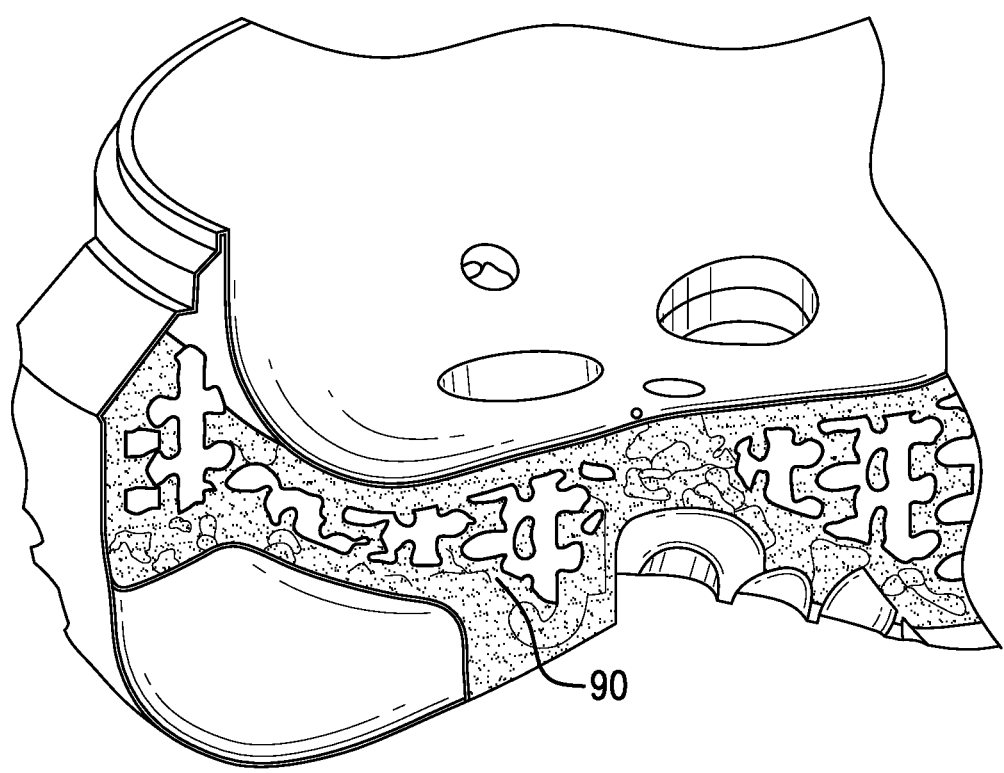
FIG. 11 is another embodiment of a bit in accordance with the teaching hereof.
Figure 12:
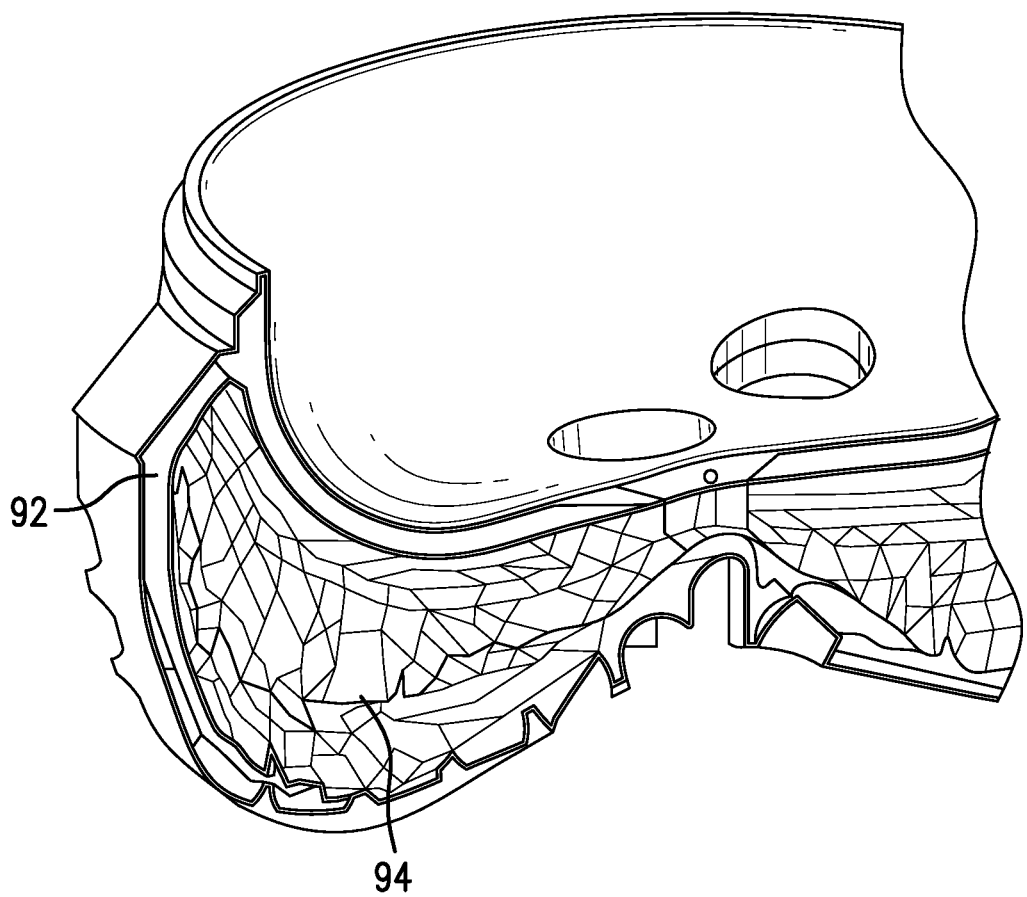
FIG. 12 is another embodiment of a bit in accordance with the teaching hereof.

Referring to FIG. 9, a schematic illustration of a leading end of a bit is illustrated in cross section to display an internal structure thereof. The internal structure is designed to effectively transmit torque from a driver either at surface or near the bit in the downhole environment without failing while the bit is cutting whatever the target is, e.g. formation, other wellbore devices to be removed, etc. Such structures will allow the drilling surface of the bit to have sufficient strength for its purpose but if drilled through from a trailing portion of the bit, the structure of the bit will quickly degrade, rendering drilling through the bit much easier. In the FIG. 9 embodiment, it is clear that multiple axially arranged rods 82 are provided within a shell 84 of the drill bit 80. These will transmit sufficient torque to the bit but when another bit attacks those structures from behind, they readily are cut away into small cuttings allowing for rapid advance of the second bit to remove the first bit. In the event the first bit had become stuck, this will allow the operator to rapidly remove that bit from the borehole and resolve a heretofore more difficult to resolve problem. It is to be understood however that although rods 82 are shown, the concept is not limited to rods but other patterns and shapes are also contemplated such as honeycombs of various geometries (shapes and sizes), etc. FIG. 10 illustrates a honeycomb structure 86 within a shell 88; FIG. 11 illustrates another honeycomb with differing material properties 90 without a specifically defined shell; and FIG. 12 illustrates a hollow shell portion 92 with a controlled failure structure 94 internal thereto.

The entire bit 80 may be created using the additive manufacturing methods discussed above or other methods capable to creating the structure as shown. Further, it is noted that the rods 82 are shown in FIG. 9 as being surrounded by air or a different material but they could also be surrounded by the same material of which they are composed but in a different state having different material parameters. In such an embodiment, only a single material need be used to construct the bit with different parameters in the additive manufacturing process so that differing strength is created in certain areas to ultimately control which portions of the tool will succumb to forces first. Additional embodiments are illustrated in FIGS. 10, 11 and 12 showing differing patterns of material property that may be useful in various particular applications.

Further contemplated are methods for improving efficiency of tools by forming tools and components with controlled failure structures such that the tools or components will benefit from further utility after failure as described above. The methods employ additive manufacturing techniques such as those described above.

Set forth below are some embodiments of the foregoing disclosure:

Embodiment 1

A downhole component comprising: a first portion; a second portion; a controlled failure structure between the first portion and second portion.

Embodiment 2

The component of any prior embodiment wherein the controlled failure structure is defined by a material property change.

Embodiment 3

The component of any prior embodiment wherein the material property change is a change in condition of the material.

Embodiment 4

The component of any prior embodiment wherein the material property change is in a selected three dimensional geometry.

Embodiment 5

The component of any prior embodiment wherein the controlled failure structure is in the form of a fishing neck.

Embodiment 6

The component of any prior embodiment wherein the controlled failure structure comprises an interface between the first portion and the second portion.

Embodiment 7

The component of any prior embodiment wherein the controlled failure structure comprises one or more discontinuities between the first portion and the second portion.

Embodiment 8

The component of any prior embodiment wherein the first portion and the second portion are portions of a drilling or milling bit.

Embodiment 9

The component of any prior embodiment wherein the controlled failure structure is in the form of a drilling or milling bit profile.

Embodiment 10

The component of any prior embodiment wherein the controlled failure structure exposes one or more cutters upon controlled failure.

Embodiment 11

The component of any prior embodiment wherein the component includes more than one controlled failure structure.

Embodiment 12

The component of any prior embodiment wherein the more than one controlled failure structures result in the same tool.

Embodiment 13

The component of any prior embodiment wherein the more than one controlled failure structures result in different tools.

Embodiment 14

The component of any prior embodiment wherein the component is a drill bit.

Embodiment 115

The component of any prior embodiment wherein the bit includes a hollow interior.

Embodiment 16

The component of any prior embodiment wherein the bit includes a honeycomb interior.

Embodiment 17

The component of any prior embodiment wherein the bit includes a rod interior.

Embodiment 18

The component of any prior embodiment wherein the controlled failure structure is interior to the bit.

Embodiment 19

A method for improving efficiency in downhole components comprising: forming a component having a controlled failure structure therein, the structure comprising a selected three dimensional geometry, the geometry exhibiting a material property distinct from surrounding material property.

Embodiment 20

A method for improving efficiency in downhole components comprising: forming a component having a controlled failure structure therein, the structure comprising a selected three dimensional geometry, the geometry exhibiting one or more areas having a material property distinct from surrounding material property.

Embodiment 21

A computer-readable storage medium having data thereon representing a three-dimensional model suitable for use in manufacturing a downhole component comprising a first portion; a second portion; a controlled failure structure between the first portion and second portion.

Embodiment 22

A computer-readable storage medium having data thereon representing a three-dimensional model of any prior embodiment wherein the controlled failure structure is a selected three dimensional geometry.

Embodiment 23

A computer-readable storage medium having data thereon representing a three-dimensional model of any prior embodiment wherein the manufacturing is additive manufacturing.

Embodiment 24

A method for making a downhole tool having a controlled failure structure that provides upon tool failure another useful profile comprising: directing a head of an additive manufacturing device to produce a first portion of the tool; directing the head of the additive manufacturing device to produce a second portion of the tool; and directing the head of the additive manufacturing device to produce a controlled failure structure between the first portion and the second portion of the tool.

Embodiment 25

The method of any prior embodiment wherein the controlled failure structure is a selected three dimensional geometric change in material properties from the first portion or the second portion such that upon a threshold torque on the tool, the controlled failure structure will fail leaving one of the first portion or second portion for additional application.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method for improving efficiency in downhole components comprising:
    forming a component having a controlled failure structure therein, the structure comprising a selected three dimensional geometry, the structure exhibiting a material property distinct from surrounding material property and the controlled failure structure upon failure creating a preselected profile on the component comprising a portion of the controlled failure structure.

2. A method for improving efficiency in downhole components comprising:
    forming a component having a controlled failure structure therein, the structure comprising a selected three dimensional geometry, the structure exhibiting one or more areas having a material property distinct from surrounding material property and the controlled failure structure upon failure creating a preselected profile on the component comprising a portion of the controlled failure structure related to a follow up operation.

3. A method for making a downhole tool having a controlled failure structure that provides upon failure of the structure, another selected three dimensional geometric useful profile comprising:
    directing a head of an additive manufacturing device to produce a first portion of the tool;
    directing the head of the additive manufacturing device to produce a second portion of the tool;
    directing the head of the additive manufacturing device to produce a controlled failure structure between the first portion and the second portion of the tool; and
    through failure of the controlled failure structure creating a preselected profile comprising a portion of the controlled failure structure.

4. The method as claimed in claim 3 wherein the controlled failure structure is a selected three dimensional geometric change in material properties from the first portion or the second portion such that upon a threshold torque on the tool, the controlled failure structure will fail leaving one of the first portion or second portion for additional application.

* * * * *